Sept. 4, 1934.  E. G. STAUDE  1,972,695
AUTOMATIC CLOSURE CONTROL
Filed Sept. 13, 1929  4 Sheets-Sheet 3
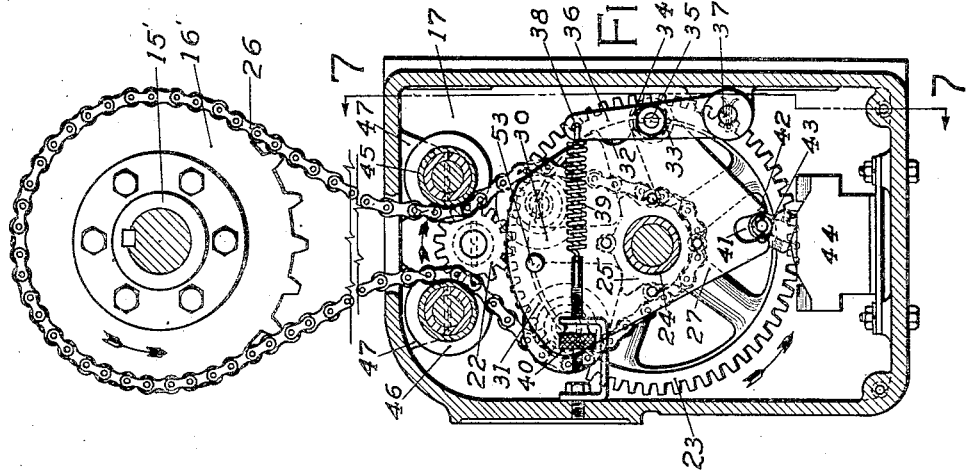
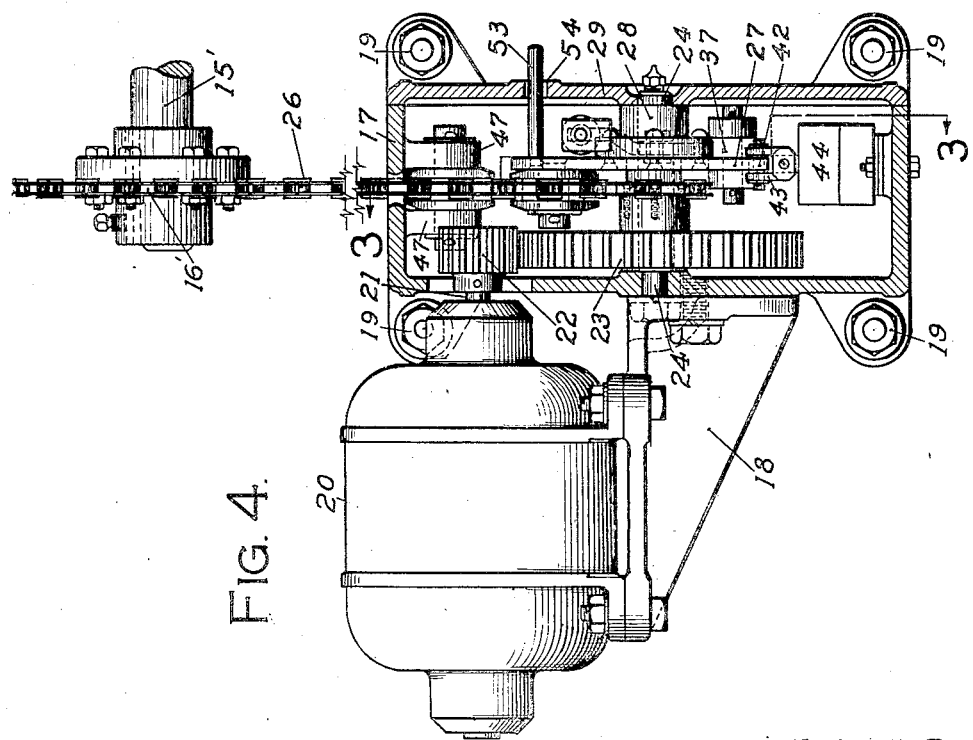
INVENTOR
EDWIN G. STAUDE
ATTORNEYS

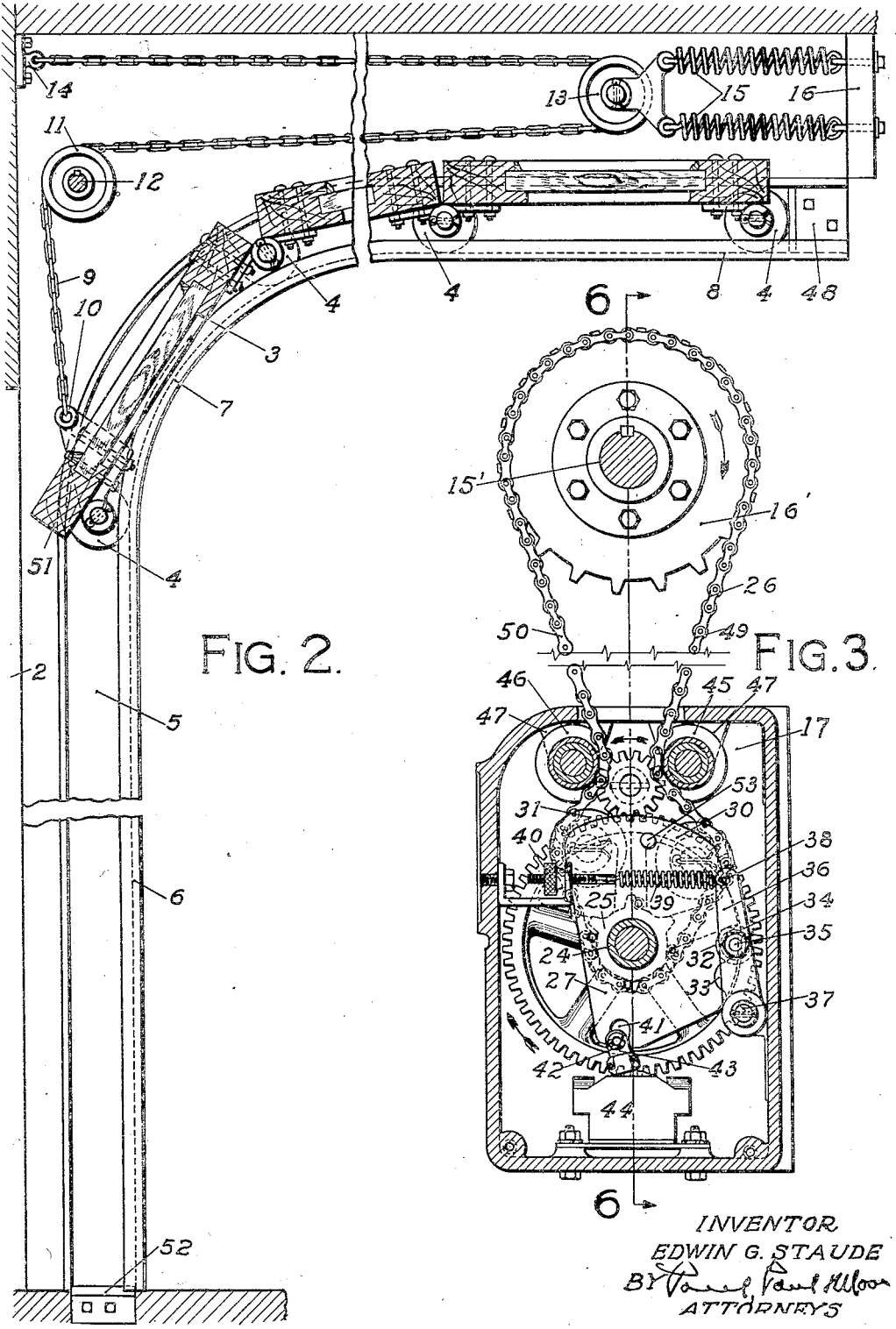

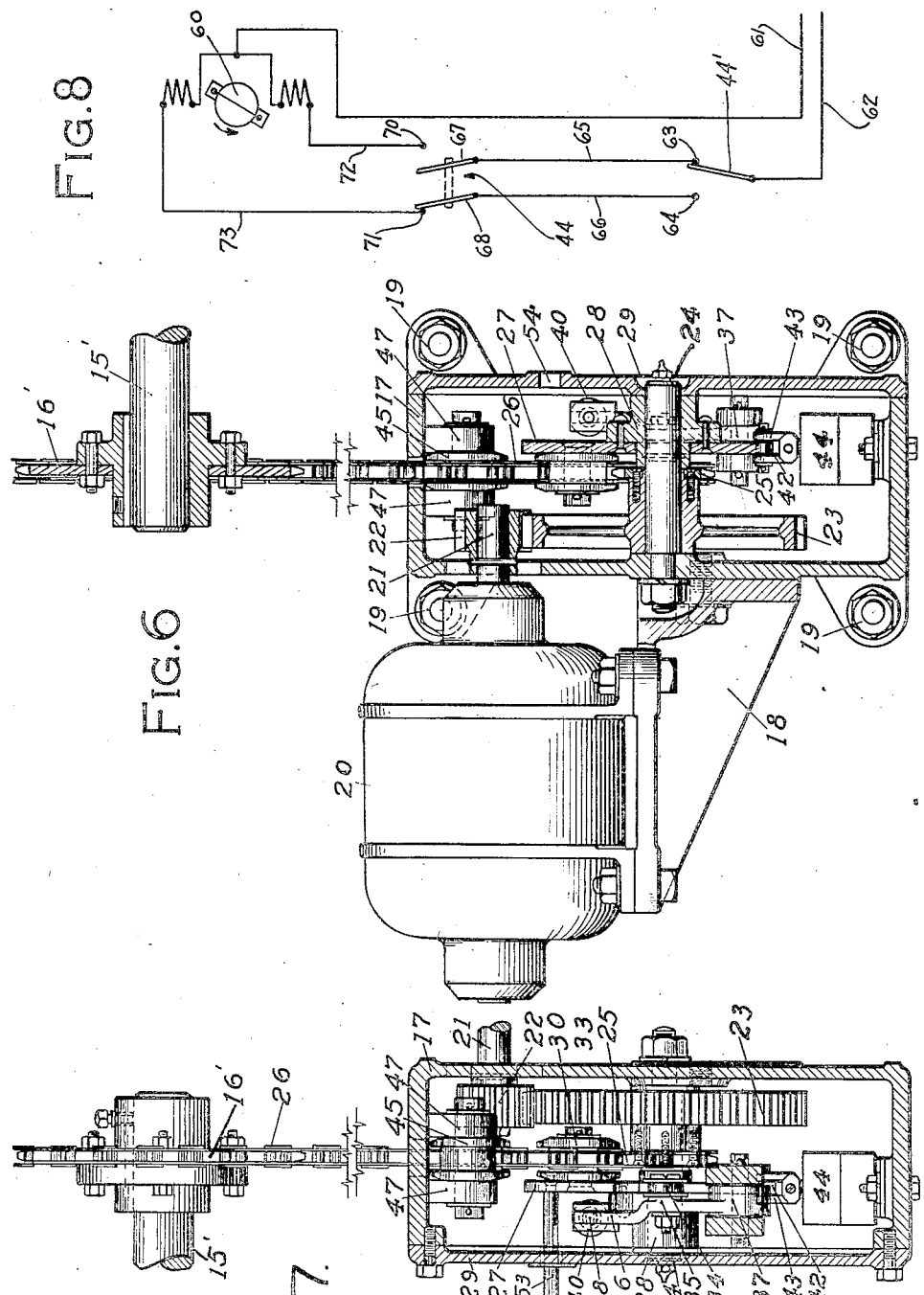

Patented Sept. 4, 1934

1,972,695

UNITED STATES PATENT OFFICE 1,972,695

AUTOMATIC CLOSURE CONTROL

Edwin G. Staude, Minneapolis, Minn.

Application September 13, 1929, Serial No. 392,395

16 Claims. (Cl. 268—59)

This invention relates to a mechanical appliance operable by suitable motive means such as an electric motor, for opening and closing doors, windows, partitions, etc. The device also finds valuable application for controlling garage doors of the "overhead" type.

One object of the invention is to provide a simple, positive means operable by a push-button electric control, to open or close a door or partition, and adapted to cause the door to automatically come to rest at either extreme position (fully closed or fully opened). Another object is to provide means whereby the push-button control (or means for reversing the action of any motive means) is reset or conditioned as the result of motion of the closure to one limit position, so that when this same push button or other push buttons in the circuit are operated a reverse motion of the closure to its opposite limit position will be immediately accomplished. A further object is to provide a simple mechanism adapted to render the door control mechanism inoperative, and immediately stop door motion in case the door strikes an obstruction during its motion in either direction, as in the case of a garage, when a vehicle or other object is in the passageway.

A further object is to provide adjustable means whereby the degree of pressure exerted by the door or closure at the extreme positions, may be easily and quickly adjusted or varied according to requirements.

A further object is to provide a simple, inexpensive mechanism which will operate in conjunction with the ordinary double pull double throw switch in common use.

Objects, features and advantages of the invention will appear from the following detailed description, and by reference to the drawings, and in said drawings:

Figure 2 is a cross-section on the line 2—2 of Figure 1, looking in the direction of the arrow, and shows the right-hand side of an ordinary overhead door, the location of the hoisting sprocket and shaft, together with the counter balancing springs, etc.;

Figure 3 is a section of the automatic control portion of the invention on line 3—3 of Figure 4;

Figure 4 shows an elevation with the enclosed gear case partly broken away to show the driving mechanism, controlling switch, etc.;

Figure 5 is a view similar to Figure 3, with the exception that the switch operating mechanism is shown in the opposite position;

Figure 6 is a vertical section on line 6—6 of Figure 3;

Figure 7 is an end view in section on line 7—7 of Figure 5, looking in the direction of the arrow; and Figure 8 is an electrical diagram of the motor and control switches therefor.

Figure 1:
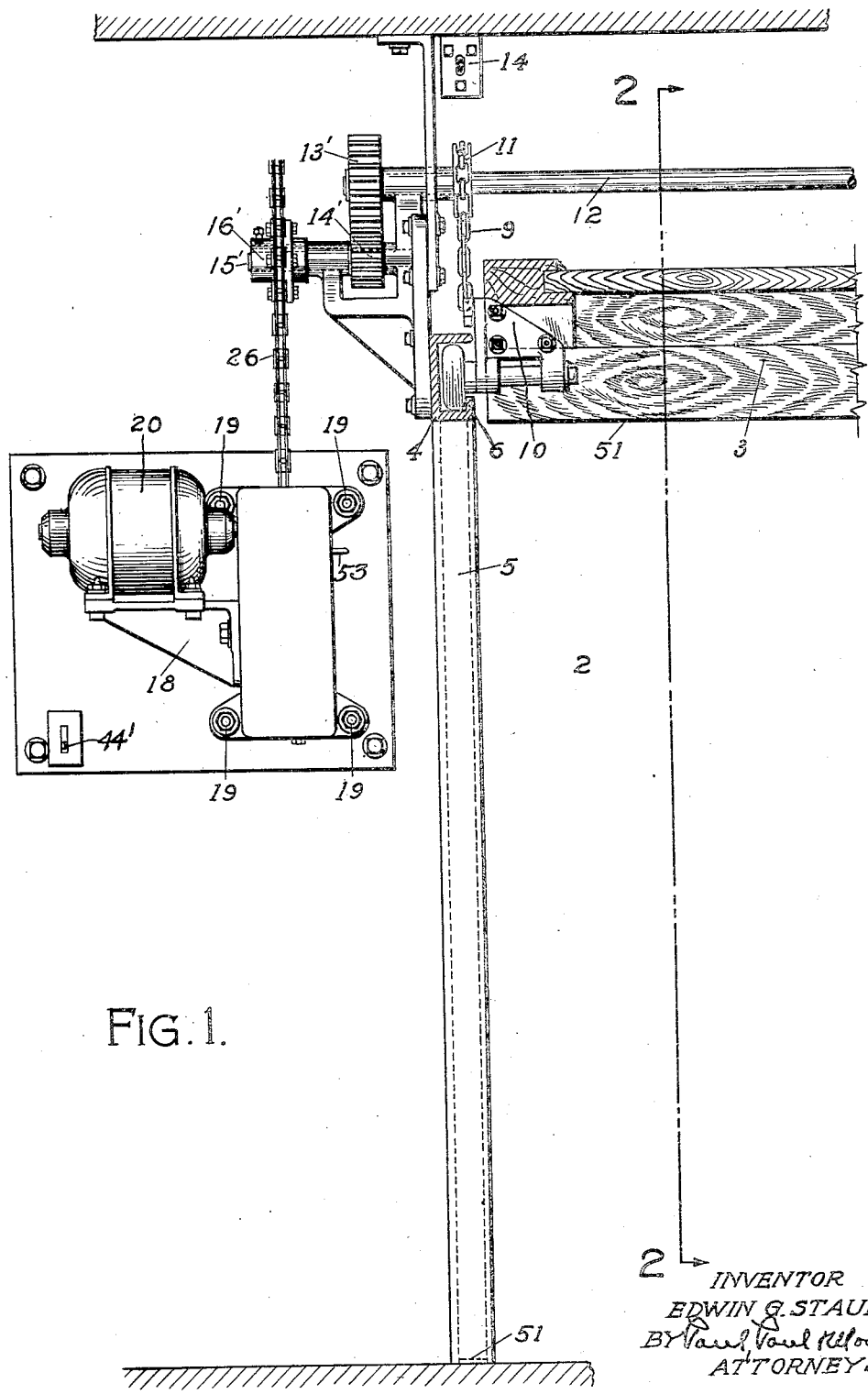
Figure 1 is an elevation partly in section showing a portion of the left-hand side of an ordinary overhead door in its "up" position, the rear portion of the door being cut away. It also shows the ordinary hoisting sprocket and the reducing gears driven by a sprocket, to which the invention is applied.

As shown in the drawings, 2 represents an ordinary door opening adapted to be closed by an overhead door 3. This door is made up in a plurality of hinged-together slat-like elements, idler rollers 4 being provided at opposite ends of the door and at the hinge axis. These idler rollers 4 operate in guide channels 5. Each guide channel 5 has a vertical section 6, a curved section 7 and a substantially horizontal section 8, so that the door sections can move to a horizontal position as the door is opened. The weight of the forward end of the door is sufficient to cause a constant pull in a downward direction.

A suitable chain 9 is provided at each end of the door at 10. The chain 9 passes over a sprocket wheel 11, keyed to a shaft 12, and passes over an idler 13 and is secured to the wall at the point 14. The idler 13 is mounted in a clevis and held in position by a pair of tension springs 15. These tension springs are secured to a block 16 and are intended to act as a counter balance, being of the correct tension so that the weight of the door when it is clear down is largely taken up by tension springs 15, because they are drawn out to the extreme position. As the door travels over the curved portion 7 of the guides and on the nearly parallel part 8 of the channel, the springs will be drawn together and will proportionately have less pull in proportion as the weight of the door decreases owing to its weight being transferred from the vertical to the nearly horizontal position. I am making this explanation merely to show a type of door to which my invention may be applied. From the above description it is clear that the door is opened or closed through revolving the shaft 12.

Referring to Figure 1, 13' is a spur gear keyed to the shaft 12 and meshing in a pinion 14'. The purpose of this is merely to get a reduction in the gearing, which may be three to one at this point. The pinion 14' is keyed to a shaft 15', and the shaft 15' carries a sprocket 16', which is also keyed to the same.

Referring to Figures 1 and 6, directly below the sprocket 16', I provide a casing 17 having a bracket 18, said casing being bolted to the wall by suitable bolts 19. The bracket 18 supports an ordinary reversible motor 20. The armature shaft 21 extends out at one side and to it is secured a pinion 22. The pinion 22 meshes into a gear 23, which is free to revolve on a stud 24. Secured to the hub of the gear 23 is a sprocket 25. A sprocket chain 26 operates around the sprocket 25 and over the sprocket 16'. It will be noted that the pinion 22 is much smaller than the gear 23 and the sprocket 25 is much smaller than the sprocket 16'. The purpose of all this is to get a suitable gear reduction from the motor speed down to the speed of the shaft 12. This is accomplished in about the proportion as shown in the drawings, same being made from units in actual every-day service. From the description above, it is clear that as the motor revolves, the power is transmitted to the train of gears and the sprocket chain hereinbefore mentioned and the shaft 12 is revolved.

In order to provide a suitable actuating mechanism for limiting the movement of the door in the extreme open or closed position, there is provided a reversing limit switch, which is just an ordinary double pole double throw switch in ordinary use and which can be wired by anyone who is familiar with the art. In order to actuate the reversing limit switch, there is provided a plate 27, mounted on a hub 28, which has a bearing on the stud 24 and is adapted to have a running fit on the stud 24 and against the sprocket 25, and held in position by the cover plate 29 of the case 17. Mounted on the plate 27 are idler rollers 30 and 31. The periphery of the plate 27 is provided with notches 32 and 33, said notches being adapted to receive a roller 34 which has a running fit on the stud 35, secured to the arm 36, which arm is pivoted as at 37. The arm has an eye at 38 to which a tension spring 39 is connected, and the spring is adjusted by the adjusting nut 40, and associated connecting rod. A notch 41 is also provided in the plate 27, adapted to receive a roller 42, which has a free running fit in the fork 43, which is the controlling member of an ordinary double pole double throw switch 44, see diagram Figure 8. Idler guide pulleys 45 and 46 are secured to the gear case 17 by suitable depending lugs 47.

The operation of my invention is as follows:

Referring to Figures 2 and 3, the position of the mechanism and direction of rotation of the gears and sprockets shown in Figure 3 correspond to the positions that these various parts assume while in motion just before the roller 4 at the extreme top of the door strikes the stop 48 (see Figure 2) or in other words, just before the closure or door reaches one of its limit positions.

When the roller 4 strikes the stop 48, the overhead door will have traveled as far up as it can go, and continued torque effort on the shaft 12 and through the gears 13' and 14' on the shafts 12 and 15' through the sprocket 16' and chain 26 will tend to stall the mechanism. But since the power comes from the reversible motor through the sprocket 25, and since the sprocket 16' can no longer move, further movement of the sprocket 25 can only serve to take up any slack that may exist. Since no slack exists on the driving side 49 of the chain 26 and since the electric current has not been cut off, it naturally follows that the motor, still exerting torque on the shaft 21 and through the gear mechanism on the driving side 49 of the chain (the sprocket chain being slack on side 50) will cause an additional force to be applied against the idler pulley 30, which is mounted on a stud secured to the plate 27. It will be noted that the plate 27 is held in the position shown in Figure 3 by the roller 34 in the notch 32, which is under the spring tension of the spring 39.

It naturally follows that as the tension of the run 29 of chain 26 increases, the chain will straighten out, and, because of the engagement of the tightening chain with the idler 30, the plate 27 moves (against the tension of the spring 39) to cause notch 32 to leave the roller 34 and to bring notch 33 into locked engagement with the roller as shown in Figure 5. This takes place practically simultaneously with the striking of the roller 4 against the stop 48, and as the plate 27 changes position, it will rock the reversing limit switch 44 through the fact that it is connected by the notch 41, the roller 42, with the yoke or operating lever 43. It is clear that when the reversing switch assumes the position shown in Figure 5, the current is off, see Figure 8, and the proper pole connections are made for reversing the motor so that when the current is again passed through the circuit by actuation of switch 44' by the operator, the motor will revolve in the opposite direction, as shown in the Figure 5, and continue to operate in that direction until the door bottom 51 strikes the floor sill 52, see Figure 2. When this occurs then the tension will increase on run 50 of the chain, and said run acting through the roller 30 will move the plate with its switch connection over to the position shown in Figure 3. The door will, of course, remain closed, the current will be off, but the switch 44 will be set in the reverse position, so that when the current is again applied by operating switch 44', the door will move to open position.

It is clear that if during motion of the door between its limit positions, it should strike any object with sufficient force to cause the tension on the chain 26 to be great enough to move the plate 27, the motion in that direction will cease. This is very important, since it provides a safety device that in event the doorway is not entirely free, no breakage or damage can occur.

In order to reverse the direction of rotation of the motor by manual effort, I provide a pin 53 riveted into the plate 27, the pin 53 projecting through a slot 54 in the cover 29 of the gear case.

From the above it is seen that as the tension of the run 25 of the chain 26 increases over its normal driving tension, it will have a tendency to straighten out, and because of the engagement of the run with the idler 30 the plate 27 is caused to move (against the tension of the spring 39) and notch 32 leaves the roller 34, bringing notch 33 into latched engagement with the roller, as shown in Figure 5.

The diagram of Figure 8 shows a reversible repulsion induction motor, and wiring connections for energizing and controlling the motor including the reversing limit switch 44 which comprises two single pole throw switches mechanically connected for movement in unison. The switch 44' is also shown in this diagram. 60 generally indicates the motor. 61 indicates one of the power lines and 62 the other power line for the motor. Single throw double pole switch 44' operates against contacts 63—64 which contacts are connected by conductors 65—66 with mechanically connected single pole switches respectively designated 67—68 and respectively operating against contact 70—71. The contact 70 is connected by conductor 72 with one side of the induction motor, and contact 71 is connected by conductor 73 with the opposite side of the motor. Referring to Figure 8, the switches 44 and 44' represent a condition of inactivity of the apparatus. Let it be supposed that this represents the condition when the door is closed. To open the door the switch 44' is thrown to the left to engage contact 64. This energizes the motor 60 through 62, 66, 68, 71, 73, and it will be assumed that the motor then rotates in the direction of the arrow. Assume that the door is now being opened. As soon as roller 4 engages stop 48 an unusual strain will be submitted to one of the runs of the chain, this run will straighten out and plate 27 will be rocked, switch 44 will be moved to condition the electrical apparatus for reversal of the motor, when the switch 44' is subsequently moved in an opposite direction. When this happens the motor 60 will be energized through 62, 44', 63, 65, 67, 70 and 72 back to 61, and the direction of motor rotation will be reversed.

It will be understood that although all details of construction are claimed, there is no intention to be entirely limited to such details nor to an electrically operable motive means, because one of the important features of the invention is the arrangement whereby the runs of a belt-like device are disposed at a point laterally of their line of draft so that when unusual strain is put upon either of the runs, (when the motion of the closure is obstructed while the motive means is operative) the motive means operation is stopped, and it is conditioned for reverse action upon actuation of suitable manually operable means.

I claim as my invention:

1. In combination, a door, motive means for operating said door including a slack belt-like driving connection, means for manually starting the motive means, means for automatically stopping the motive means and conditioning it for reverse action, said belt-like driving connection having its runs slidable against said stopping and reversing means and each alternately adapted when taut to operate said means to stop the motive means and condition it for reverse motion when the motion of said door is obstructed.

2. A device of the class described comprising a closure mechanism including a movable closure element, a reversible motor including a reversing switch, means operatively connecting the motor with the movable element, said means including an endless driving element having its runs arranged laterally of the line of draft, means connected to throw the reversing switch alternately in opposite directions, and having elements alternately engageable by opposite runs of said driving element in a manner to alternately move the element to correspondingly move the switch to opposite control positions, as the runs are drawn taut.

3. A closure controlling mechanism, comprising a movable closure element, a reversible motor, and a reversing switch therefor, driving means operatively connecting the motor with the movable closure element including an endless drive element cooperating with a reversing switch controlling device, said reversing switch controlling device comprising a mechanism for operating the reversing switch when said mechanism is actuated by the increased resistance in the endless driving element as the movement of the closure element in either direction is obstructed, and a yielding element for causing the reversing switch controlling device to normally remain in either extreme position with respect to the center or neutral position to insure a substantial increase in the normal driving resistance in the driving mechanism before the operation of the reversing switch controlling device.

4. A closure controlling mechanism, comprising a movable closure element, a reversible motor, and, a reversing switch therefor, driving means operatively connecting the motor with the movable closure element through a reversible switch controlling device, said reversible switch controlling device comprising an oscillating member yieldingly held in either extreme position with respect to the center or neutral position, a pair of stops mounted on said oscillating member, and adapted to rock the oscillating member into the opposite position when a substantial increase in the normal driving resistance occurs.

5. A reversing motor, and a reversing switch for controlling it, a closure, driving connections between the motor and closure including endless flexible draft means having two slack runs, means for holding said runs laterally of the line of draft, a reversing switch control element and means for yieldably holding it against control motion, said switch control element having means operable by said runs to move the control element against the action of said holding means on continued application of driving force, after the closure engages an obstruction.

6. A reversing motor, a switch for controlling it, a closure, driving connections between the motor and the closure including, two shafts, and a sprocket chain and wheels in driving connection therewith, a rockable switch control element and means for yieldably holding it at two positions, idlers for the chain carried by the control element and lying between the sprocket runs and spaced one at each side of a line cutting the axes of the shafts, and a second pair of idlers lying between the first idlers and the other sprocket wheel and more closely spaced than the first mentioned sprockets, and disposed at the outer sides of the runs.

7. A reversing motor and a reversing switch for controlling it, a closure, driving connections between the motor and the closure including an endless element and means for holding its runs laterally of and inwardly from the line of draft, a switch control element for the reversing switch and means yieldably holding it against control motion, said reversing switch control element having means operable by the runs of said endless element to move the control element against the action of said holding means on continued application of driving force after the closure engages an obstruction.

8. A reversing motor and a switch for controlling it, a closure, driving connections between the motor and the closure including a sprocket chain and wheels, and means for holding its runs laterally of and inwardly from the line of draft, a switch control member and means for yieldingly holding it against control motion, said switch control element having idler wheels with which the inner sides of said chain runs are engaged, to move the control element on continued application of driving force after the closure engages an obstruction, one of the sprocket wheels and said switch control element being rotatable on a common axis.

9. In combination a movable closure element, a reversible motor and electrical reversing connections therefor including a reversing switch, driving means operatively connecting the motor and the movable element, including a belt-like element including two slack runs and means by which said runs are adapted when drawn taut to alternately move the reversing switch from one control position to another, conformably to reversing motions of the driving means.

10. In combination a door, motive means for operating said door, including a belt-like element having two slack runs, means for manually starting the motive means, means for automatically stopping the motive means and conditioning it for reverse action including a reversing switch, said belt-like element having means which acts alternately as the result of alternate tightening of its slack runs, to correspondingly operate said stopping and reversing means to stop the motive means and condition the motive means for reverse action when the door reaches one or the other of its motion limits.

11. A device of the class described comprising a movable closure element, a reversible motor and reversing switch therefor, driving means operatively connecting the motor with the movable closure element including a belt-like element having two slack runs, a reversing switch controlling device for operating the reversing switch and actuated as a result of actions which tend to alternately straighten the runs as the movement of the closure element in either direction reaches its motion limit.

12. In combination, a movable closure element, a reversible motor and reversible electrical connections therefor including a reversing switch, driving means by which reversing motions of the closure element are obtained conformably to motor reversal, including an endless element having two slack runs, and means by which alternate tightening of the slack runs correspondingly controls the switch to alternately reverse the motor.

13. In combination, a movable element, a reversible motor and electrical reversing connections therefor including a reversing switch, speed-reducing means for driving the movable element by the motor including a normally slack belt-like driving element and means against which the runs of said driving element slide for alternately moving the switch from one control position to the other, as slack is taken up.

14. In combination, a movable element, a reversible element, a reversible motor and electrical reversing connections therefor including a reversing switch, speed-reducing means for driving the movable element by the motor including a normally slack belt-like driving element, and means against which the runs of said driving element slide for alternately moving the switch from one control position to the other as slack is taken up, the runs being normally arranged laterally of the line of draft and adjacent one another, and being adapted to perform their switch-moving functions by motion in a direction away from one another.

15. A structure providing a door of the overhead sliding type, a door control shaft and means by which it controls the door to move it to limit positions, a sprocket wheel on the shaft, a reversible motor and electrical reversing connections therefor including a reversing switch, speed reducing driving means between the motor and the door-controlling shaft including a stud, a gear rotatable on the stud and driven by the motor, a sprocket wheel rotatable with the gear, a normally slack sprocket chain in operative relation with the sprocket wheels, a plate rockable on the stud, means by which the plate controls the switch, detent means for releasably holding the plate in each of two switch control positions, and plural means on the plate, one means engaged with one slack run and so arranged that the take-up of slack in that run will operate the switch to stop the motor, and the other means engaged with the opposite run so that take-up of slack in that run will operate the switch to stop the motor.

16. In combination with a structure including a door of the over-head sliding type, a door control shaft and means by which it controls the door to move it to limit positions, a reversible motor, speed reducing driving means between the motor and the door control shaft including a normally slack endless driving element, reversing electrical connections for the motor including a reversing switch, a rockable member, means by which the members control the switch, detent means for releasably holding the member in each of two switch-controlling positions, means by which an operation to take up the slack of one run of said endless element operates the member to move the switch to stop the motor, and means by which an operation to take up slack of the other run operates the member to stop the motor, whereby the motor is stopped if the door strikes any obstruction, whatever the direction of motion of the door.

EDWIN G. STAUDE.